United States Patent [19]
Hideo et al.

[11] 3,891,310
[45] June 24, 1975

[54] MACRO FOCUSING DEVICE FOR VARIABLE FOCAL LENGTH LENS

[75] Inventors: Hirokawa Hideo, Tokyo; Mizuki Yoshiaki, Iruma, both of Japan

[73] Assignee: Bell & Howell Company, Chicago, Ill.

[22] Filed: Feb. 8, 1974

[21] Appl. No.: 440,910

[30] Foreign Application Priority Data
Feb. 9, 1973  Japan.................... 48-17782

[52] U.S. Cl.................. 350/187; 350/255
[51] Int. Cl.².......................... G02B 7/10
[58] Field of Search.............. 350/186, 187, 255

[56] References Cited
UNITED STATES PATENTS
3,613,544  10/1971  Plihal et al................ 350/187 X
3,731,987  5/1973  Iida et al.................... 350/187

Primary Examiner—John K. Corbin
Attorney, Agent, or Firm—John E. Peele, Jr.

[57] ABSTRACT

For a zoom objective with macro photography capability, movable elements are selectively adjusted by a simplified lens moving device to cause either changes of focal length or changes of the focus zone from a normal zone to a close-up or macro photography zone. In a sleeve of the lens mount is formed a pair of elongated grooves in which cam follower pins respectively on a variator lens cell and a compensator lens cell are carried for simultaneous adjustment during varying the focal length of the objective when adjusted together by cam slots in a cell supporting barrel. A relief groove is formed in the sleeve to permit the variator lens to be adjusted without altering the compensator lens cell for focusing the objective lens at close distances.

6 Claims, 3 Drawing Figures

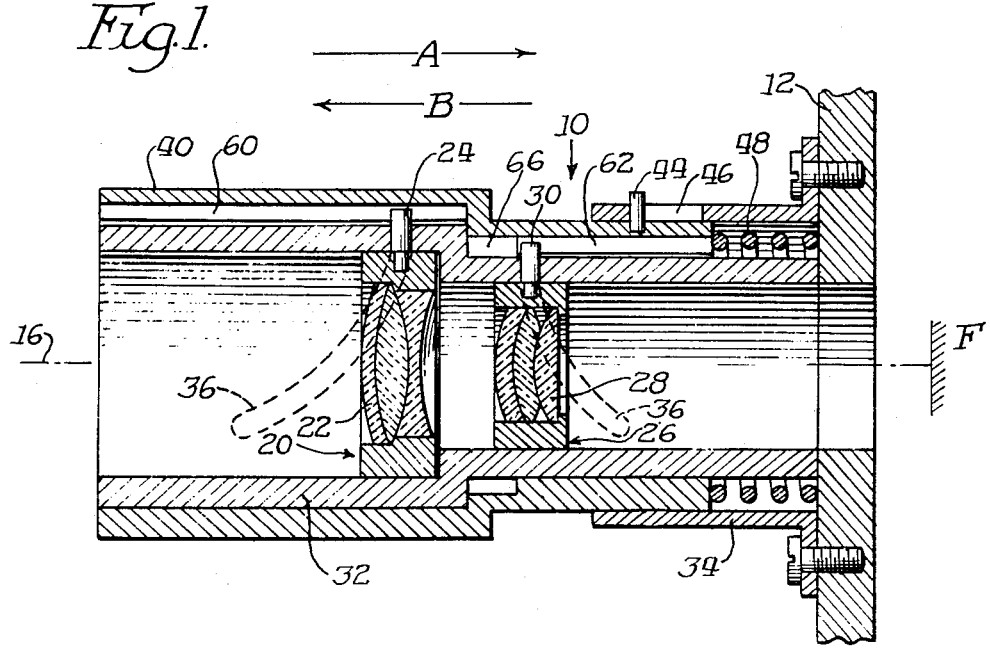
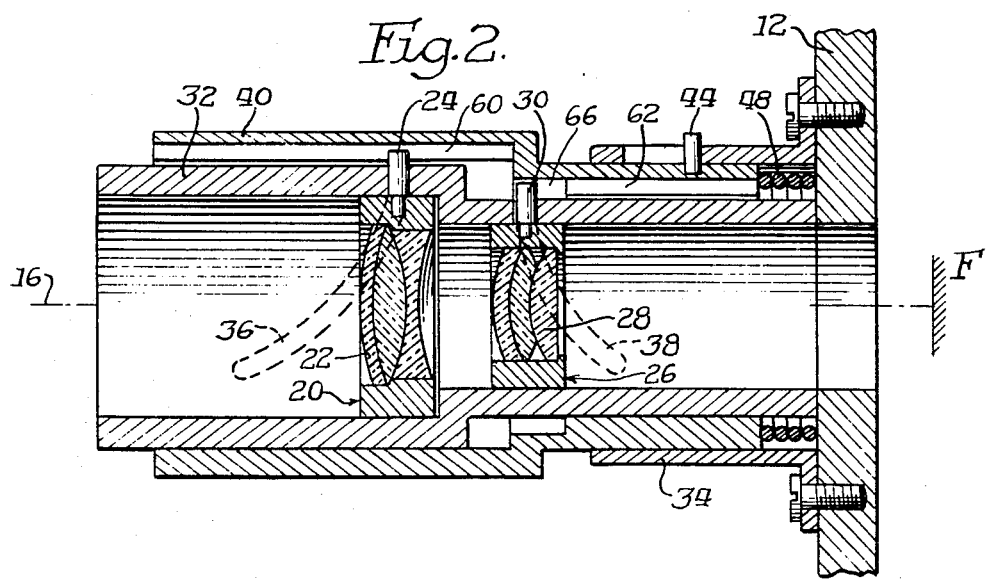
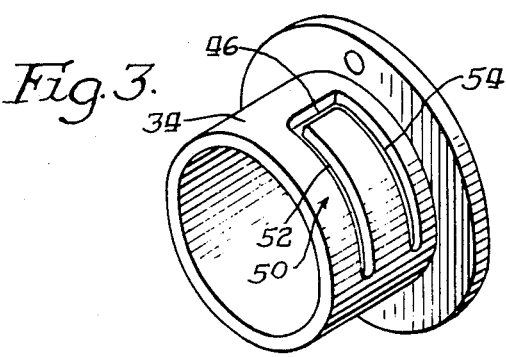

MACRO FOCUSING DEVICE FOR VARIABLE FOCAL LENGTH LENS

The present invention relates to a mechanism for relative and selective axial adjustment of optical components of a zoom objective lens for a camera to provide alternatively for variation of the focal length and close-up focusing.

Recently, cameras have been introduced having variable focal length or zoom lenses in which the variator lens cell is movable without movement of the compensator lens cell to enable focusing closer than the usual close focusing distance. That is, the independent axial displacement of the variator cell permits close-up or macro focusing of the objective at minimum distances significantly less than the earlier standard of approximately ten times the focal length of the lens. Since the relative axial positions of optical elements in an objective lens require critical positioning for sharp focus of the image of a remote object on the focal plane of the camera, generally the lens mount has been relatively expensive to manufacture and assemble in that the lens cell adjusting devices have been relatively complex and required maintenance of relatively critical tolerances to prevent undue optical degradation.

For close-up photography with cameras having variable focal length or zoom lenses, the variator lens cell is moved without moving the compensator lens cell along the optical axis. To accomplish the independent adjustments, the mounts of these lenses are provided with a first ring that adjusts the variator lens cell and a second ring to adjust the compensator lens cell. The rings are connected by a clutch device for rotation together either manually or by a power drive. To cause the zoom effect, the lens cells are simultaneously moved axially of the optical axis with their predetermined relative spacings coordinated. To cause focusing at the close range distances, the two rings are separated by releasing the clutch device so that only the variator cell is axially moved upon rotation of the ring by which it is adjusted. That is, the ring which adjusts the compensator lens cell is not moved axially. The plural rings and clutch of this type assembly have several shortcomings in that looseness or relative movement between the cells and rings can cause rattling to occur when the rings are rotated since they are connected with the clutch device. Also, optical aberations, affecting the resolving power of the lens, can occur due to the uncompensated looseness of the lens cells. To overcome these problems, very severe tolerance controls are required in the manufacture and assembly of the rings and clutch device.

Since the rings are independent and are connected by the clutch device, the operator must release the clutch device, coupling the ring or zooming, to separate the two rings for close-up photography. That is, to change from a first operation mode to the other, the operator must release or re-connect the clutch and must remember to change the hand to the ring which operates the lens cell to be adjusted. Usually, the ring driving the variator cell for close focusing is different from the ring used for combined driving of the two rings to accomplish the zoom effect.

The present invention in an improved lens mount overcomes the several problems by providing a single sleeve to enable both zooming to change the focal length of the lens and focusing for close-up photography. As there is only one ring, a clutch device is not required, and the possible play or looseness between components which can occur with two rings and a clutch device can not occur. Thus, the present apparatus eliminates the shortcomings of the prior art lens control devices while providing a combined and simplified mechanism easier to manufacture and assemble for controlling the zooming effect and enabling focusing the lens for close-up photography. This desired result is accomplished by providing a single lens cell driving sleeve which is displaceable to different axial positions along the optical axis, and is rotatable about the optical axis in either position to selectively drive one or more lens cells.

An object of the present invention is to provide an improved lens mount for controlling the zoom and close focusing operation of a variable focal length objective lens by actuation of a single sleeve.

Another object of the invention is to provide a single control sleeve for a lens mount which sleeve is axially and rotatably adjustably for selective control of lens cells for causing zooming and close focusing operations of an objective lens.

The above and other objects of the invention will be more fully understood from the following detailed description of preferred embodiments thereof taken in connection with the accompanying drawings wherein:

FIG. 1 is an elevational view, in section, of a lens mount incorporating the present invention with components in a position for a first function;

FIG. 2 is a view similar to FIG. 1 with components shifted for the alternate function; and FIG. 3 is a perspective view of the control ring.

In the drawings is shown a variable focal length or zoom, focusable objective lens 10 fixed to a camera housing 12 to cause the image of a scene to impinge on film F, shown schematically, at the focal plane of the camera. The lens 10 defines an optical axis 16 and includes a variator cell 20 in which elements of a variable lens component 22 are carried. Extending radially from the periphery of the barrel of the cell 20 is a guide pin 24. A compensator cell 26 carries the elements of a compensator lens component 28. A guide pin 30 extends radially from the periphery of the compensator cell 26. The variator and compensator lens cells are assembled for sliding and rotational movement in a barrel 32. The barrel 32 and a supporting ring or cylinder 34 are fixed on the camera body by a known method to maintain alignment of the optical axis relative to the focal plane of the camera. The barrel 32 has cam slots or grooves 36, 38 into which the guide pins 24, 30 extend from the lens cells. In this preferred embodiment, the guide pin 24 of the variator cell 20 extends into cam slot 36, while the pin 30 of the compensator lens cell 26 extends into cam slot 38.

An operating ring or sleeve 40 is assembled about the barrel 32 in which the cam slots 36, 38 are formed. The operating ring is mounted for rotation about the optical axis 16 and for relative sliding movement axially of the objective lens 10. In this preferred embodiment, the axial displacement of the sleeve is limited by a pin 44 which is fixed and extends radially from the periphery of the sleeve. At both forward and rearward displacement limits, the pin 44 abuts the ends of a slot 46 formed in the supporting ring 34. The sleeve 40 is urged outwardly relative to the camera housing by a coiled spring 48 located between the inner end of the sleeve and the adjacent housing. In the spring urged or forward extended position, shown by arrow B, the sleeve provides for zooming, while in the retracted position of the sleeve, shown by arrow A, the close focusing operation can be performed.

The limiting slot 46 in the supporting ring 34 is the base of an essentially U-shaped guide slot 50, shown in FIG. 3. One leg of the slot defines a zooming guide groove 52 which extends transversely of the optical axis. The other leg of the slot extends parallel with leg 52 and defines a close-focusing guide groove 54. The length of the limiting slot is that distance required for axial displacement of the operating grooves 52, 54. The lengths of guide grooves 52 and 54 about the ring are the same as the number of degrees through which the lens cells are rotatable by the operating sleeve 40 for zooming of the lens and focusing for close-up photography.

Internally of the sleeve 40, a pair of elongated grooves 60, 62 are formed to extend axially of the objective lens to receive respectively the ends of guide pins 24 and 30. A relief groove 66 is formed in the sleeve between the elongated grooves 24 and 30. The relief groove has an interior wall forming a recess that is greater than the length of the pin 30 of the compensator lens cell 26 as the pin protrudes through the cam slot 38 of the supporting barrel 32. The elongated drive groove 60 is of sufficient axial length to receive and retain the guide pin 24 of the variator lens cell at both its maximum and minimum axial displacement relative to the housing 12. Further, the elongated groove is slightly greater in length than the axial extent of the cam slot 36 in which the guide pin 24 moves. The additional length of the groove is sufficient so that the guide pin does not come out of the groove even if the guide pin is moved to its minimum or maximum distance relative to the film.

The length of the elongated groove 62 is selected to enable the compensator lens cell 26 to move the length of the groove and proximate to the connecting relief groove 66 when the operating sleeve 40 is in the zoom position. When the sleeve is in the retracted or focus position, the guide pin 30 can be displaced into the relief groove which extends at least partially around the sleeve interior so that the compensator lens cell is not rotated when the sleeve is rotated. However, when the operating sleeve is in the forward position, i.e. urged in the direction of arrow B, the compensator lens cell is again coupled for coordinated movement with the variator lens cell 20.

Operation of the lens mount according to the present invention has been explained in part along with the description of the components. Both the zooming and focusing for close-up photography operations are controlled soley by the operating sleeve 40. When the zooming operation is to be performed, following a zooming operation, the user need only rotate the operating sleeve which drives the variator and compensator lens cells through their respective pin connections in elongated grooves internal of the sleeve. That is, the guide pin of the variator lens cell is caused to move in the cam slot in mutual or coordinated relation with the movement of the compensator lens cell which is moved in the other cam slot. To change from the zoom operation to the close focusing operation, the operating sleeve is rotated until stopped by the guide pins engaging appropriate ends of the cam slots. The sleeve is then retracted or moved toward the camera housing in the direction shown by the arrow A, so that the guide pin in the sleeve moves to engage the end of the limiting slot in the barrel opposite the end from which the guide pin was moved. At this time, the guide pin of the variator lens cell remains in the elongated groove of the sleeve and the guide pin of the compensator lens cell is removed from its elongated groove and, is arranged in the recess of the relief groove. Upon rotational operation of the sleeve in this position, the variator lens cell alone is driven for axial movement as the sleeve rotates with the guide pin of the compensator lens being in the recess and therefor not engaged to be driven by the sleeve.

To recondition the lens for zooming operation after close-up photography, the operating sleeve is rotated to cause the guide pin to be aligned at the base of the U-shaped slot. The sleeve may then be released for axial movement in the direction of arrow B under the urging of the spring. The degree of forward movement of the sleeve is limited by the engagement of the guide pin against the edge of the limiting slot. During this movement, the guide pin of the compensator lens cell is removed from the relief recess and returned into the appropriate elongated groove within the sleeve. In this condition, rotation of the sleeve again causes simultaneous movement of both the variator and compensator lens cells.

In another embodiment, the relief 66 can be formed at the end of the elongated groove 62, but adjacent the camera housing rather than spaced therefrom. In such a construction, the guide pin of the compensator lens cell is removed from the elongated groove and moved into the relief upon moving of the sleeve in the direction of arrow B. This can occur when the guide pin of the compensator lens cell is positioned nearest the housing as permitted by the cam slot 38. The sleeve biasing spring 59 may be installed between the forward end of the operating sleeve and a forward fixed portion of the objective lens. The guide pin of the compensator lens cell can be withdrawn from the elongated groove and moved into the relief groove by extending the operating sleeve axially in the direction of arrow A even if the guide pin is not positioned at either end of the cam slot but intermediate the ends thereof. The lens barrel and the cam slots therein can be retained substantially unchanged with respect to the above described preferred embodiment.

Changes and modifications may be made in the embodiments of this improved lens mounted without departing from the essential concept of the invention.

What is claimed is:

1. In a lens mount for a variable focal length objective lens defining an optical axis and being capable of close focusing relative to a camera housing, the lens having a variator lens cell and a compensator lens cell, the improvement comprising:
    a barrel fixed to the camera housing and having first and second cam slots formed therein;
    an operating sleeve arranged for rotational and axial movement relative to the optical axis for causing focal lenght varation by simultaneous adjustment of said variator and compensator lens cells and close focusing by adjustment of said variator lens cell alone including:
    an elongated groove for driving said variator lens cell relative to said barrel upon rotation when said sleeve is in either a first axial position for focal length variation or a second axial position for close focusing;

an elongated groove for driving said compensator lens cell relative to said barrel upon rotation when said sleeve is in said first axial position;

the variator lens cell having a guide pin cooperating with one of said cam slots in said barrel and one of said elongated groove in said sleeve; and the compensator lens cell having a guide pin cooperating with another of said cam slots in said barrel and another of said elongated grooves in said sleeve;

the sleeve further including:

a relief groove for selectively receiving said guide pin of said compensator lens cell when said sleeve is in one of said axial positions so that only said variator lens cell is driven axially in said barrel upon rotation of said sleeve.

2. A lens mount as in claim 1 wherein said cam slots formed in said barrel cause rotation and axial displacement of said lens cells upon rotational drive by said sleeve when said guide pins on said lens cells engage in said elongated grooves of said sleeve.

3. A lens mount as in claim 2 wherein said relief groove in said sleeve is open to one of said elongated guide pin receiving grooves to permit relative movement of said guide pin to and from said relief groove and said elongated groove.

4. A lens mount as in claim 3 including a lens supporting ring attached to the camera housing and having a limit slot formed longitudinally therein along which a limit pin on said sleeve is displaceable.

5. A lens mount as in claim 4 wherein said lens supporting ring is provided with a U-shaped guide slot including said limit slot and, a pair of legs extending therefrom, said limit pin movable from said limit slot into said legs during lens adjusting operations.

6. A lens mount as in claim 5 wherein a spring is arranged relative to said sleeve to cause said limit pin to engage one end of said limit slot, while permitting manual displacement of said sleeve to cause said limit pin to engage the other end of said limit slot.

* * * * *